United States Patent
Wang et al.

(10) Patent No.: US 10,069,344 B2
(45) Date of Patent: Sep. 4, 2018

(54) METHOD AND DEVICE FOR TRANSMITTING AND RECEIVING WIRELESS POWER

(71) Applicant: ZTE CORPORATION, Shenzhen, Guangdong Province (CN)

(72) Inventors: Hongwei Wang, Shenzhen (CN); Zhifeng Fan, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 95 days.

(21) Appl. No.: 15/035,663

(22) PCT Filed: Mar. 5, 2014

(86) PCT No.: PCT/CN2014/072922
§ 371 (c)(1),
(2) Date: May 10, 2016

(87) PCT Pub. No.: WO2014/135082
PCT Pub. Date: Sep. 12, 2014

(65) Prior Publication Data
US 2016/0268845 A1 Sep. 15, 2016

(30) Foreign Application Priority Data
Nov. 20, 2013 (CN) .......................... 2013 1 0589399

(51) Int. Cl.
*H02J 50/12* (2016.01)
*H02J 50/80* (2016.01)
*H02J 7/02* (2016.01)

(52) U.S. Cl.
CPC .............. *H02J 50/12* (2016.02); *H02J 7/025* (2013.01); *H02J 50/80* (2016.02)

(58) Field of Classification Search
CPC ...................................................... H02J 50/00
See application file for complete search history.

(56) References Cited

U.S. PATENT DOCUMENTS 7,109,682 B2 * 9/2006 Takagi .................. H02J 7/0054
320/108
7,791,311 B2 * 9/2010 Sagoo ..................... H02J 7/025
320/103
(Continued)

FOREIGN PATENT DOCUMENTS

CN 103269114 A 8/2013
CN 103280899 A 9/2013
(Continued)

OTHER PUBLICATIONS

International Search Report (Form PCT/ISA/210) for International Application No. PCT/CN2014/072922 dated Aug. 13, 2014.

*Primary Examiner* — Jeffrey Zweizig
(74) *Attorney, Agent, or Firm* — Koppel, Patrick, Heybl & Philpott

(57) ABSTRACT

The embodiments of disclosure disclose a method and device for transmitting and receiving wireless power. The method includes: switching a state of a resonance element used for transmitting and receiving electromagnetic waves to an electromagnetic wave transmission state; boosting a first direct current output by a mobile device to a second direct current having a predetermined voltage; inverting the second direct current to an alternating current; converting the alternating current into an electromagnetic wave and transmitting the electromagnetic wave, wherein the electromagnetic wave is used for charging a to-be-charged device. The embodiments of the disclosure provide a solution for wirelessly charging peripherals through a terminal and thus solves a problem that there is no solution provided to wirelessly charge peripherals through the terminal in the related art.

9 Claims, 7 Drawing Sheets

(56) References Cited

U.S. PATENT DOCUMENTS 9,083,391 B2 * 7/2015 Teggatz ............... H04B 5/0031
2013/0026981 A1 * 1/2013 Van Der Lee .......... H02J 5/005
                                                              320/108

FOREIGN PATENT DOCUMENTS

| CN | 203180655 U | 9/2013 |
| CN | 203233243 U | 10/2013 |

* cited by examiner

US 10,069,344 B2

METHOD AND DEVICE FOR TRANSMITTING AND RECEIVING WIRELESS POWER

TECHNICAL FIELD

The disclosure relates to the communications field, and in particular to a method and device for transmitting and receiving wireless power.

BACKGROUND

Wireless charge is a new scheme put forward in recent years for transmitting electrical energy, which attracts wide attentions and for which a Wireless Power Consortium (WPC) has been established. In present markets, the wireless charge has not been spread. A wireless power transmission system mainly includes two parts: a transmitter and a receiver. The transmitter completes a conversion of electricity into electromagnetic wave, mainly taking a charge platform as a carrier; the receiver completes a conversion of the electromagnetic wave into the electricity, mainly taking a mobile terminal as a carrier.

The inventor finds during a study process that in existing schemes there is no solution to realize a function of wireless power transmission at a terminal, especially at a mobile phone, due to a limitation of electrical energy storage in the terminal and a limitation of terminal size in the related art. However, with the development of technologies, the electrical energy storage of the terminal will be increasingly improved. Therefore, supplying power to peripherals through the terminal, especially wireless charge, under a premise of ensuring a proper size of the terminal, will have a vast market requirement and a promising application prospect. However, there is no solution provided to wirelessly charge peripherals through the terminal in the related art.

In view of a problem that there is no solution provided to wirelessly charge peripherals through the terminal in the related art, no effective solution has been put forward so far.

SUMMARY

The embodiments of disclosure provide a method and device for transmitting and receiving wireless power, so as at least to solve the above-mentioned problem.

One embodiment of the disclosure provides a device for transmitting and receiving wireless power, including: a wireless power receiving component and a wireless power transmitting component, wherein the wireless power receiving component and the wireless power transmitting component share one resonance element; the wireless power transmitting component further includes: a boosting element and an inversion element; the boosting element is configured to boost a first direct current output by a mobile device to a second direct current having a predetermined voltage; the inversion element is connected with the boosting element and configured to invert the second direct current to an alternating current; the resonance element is connected with the inversion element and configured to convert the alternating current into an electromagnetic wave and transmit the electromagnetic wave, wherein the electromagnetic wave is used for charging a to-be-charged device.

In an example embodiment, the resonance element is further configured to convert a received electromagnetic wave into an alternating current and transmit the converted alternating current to a rectification element of the wireless power receiving component.

In an example embodiment, the device further includes: a switch element, which is configured to switch on a connection between the inversion element and the resonance element or switch on a connection between the rectification element and the resonance element.

In an example embodiment, the device further includes: a master control component, which is configured to send a switching signal to the switch element according to an input of a user, wherein the switching signal is used for indicating the switch element to switch on a connection between the inversion element and the resonance element, or, between the rectification element and the resonance element.

In an example embodiment, the master control component is further configured to send control information, wherein the control information is used for adjusting at least one parameter of the boosting element or the inversion element.

In an example embodiment, the boosting element includes: a voltage detection subelement, a first Pulse Width Modulation (PWM) control subelement and a boosting subelement, wherein the voltage detection subelement is configured to detect a voltage of a direct current output by the boosting subelement and to feed back a detection result to the master control component; the first PWM control subelement is configured to determine a PWM signal duty ratio according to the control information sent by the master control component, wherein the control information is determined by the master control component according to the detection result; the boosting subelement is configured to adjust the voltage of the output direct current to the predetermined voltage according to the PWM signal duty ratio.

In an example embodiment, the inversion element includes: a second PWM control subelement and an inversion subelement, wherein the second PWM control subelement is configured to determine at least one parameter of the inversion subelement according to the control information sent by the master control component; the inversion subelement is configured to invert the second direct current to the alternating current according to at least one parameter determined by the second PWM control subelement.

In an example embodiment, further including: a communication component, which is configured to interact information with the to-be-charged device and send the information to the master control component, wherein the master control component determines the at least one parameter of the inversion element according to the information.

According to another aspect of the embodiment of the disclosure, a method for transmitting and receiving wireless power is provided, including: switching a state of a resonance element used for transmitting and receiving an electromagnetic wave into an electromagnetic wave transmission state; boosting a first direct current output by a mobile device to a second direct current having a predetermined voltage; inverting the second direct current to an alternating current; converting the alternating current into an electromagnetic wave and transmitting the electromagnetic wave, wherein the electromagnetic wave is used for charging a to-be-charged device.

In an example embodiment, boosting the first direct current output by the mobile device to the second direct current having the predetermined voltage includes: detecting a voltage of the output boosted direct current and sending the detection result to a master control component; determining a PWM signal duty ratio according to control information sent by the master control component, wherein the control information is determined by the master control component according to the detection result; adjusting the voltage of the output direct current to the predetermined voltage according to the PWM signal duty ratio.

In an example embodiment, inverting the second direct current to the alternating current includes: determining at least one parameter used for inverting the second direct current according to the control information sent by the master control component; inverting the second direct current to the alternating current according to the at least one parameter used for inverting the second direct current.

Through the embodiments of the disclosure, the state of the resonance element used for transmitting and receiving an electromagnetic wave is switched to the electromagnetic wave transmission state; a first direct current output by a mobile device is boosted to a second direct current having a predetermined voltage; then the second direct current is inverted to an alternating current; the alternating current is converted into an electromagnetic wave and the electromagnetic wave is transmitted, wherein the electromagnetic wave is used for charging a to-be-charged device. The embodiments of the disclosure provide a solution for wirelessly charging other peripheral devices through a terminal (a mobile device), and thereby solves the problem in the related art of a lack of such a solution.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION

It needs to be noted that the embodiments in the application and the characteristics of the embodiments can be combined if no conflict is caused. The disclosure is described below in detail by reference to the accompanying drawings in conjunction with embodiments.

Steps shown in flowcharts in accompanying drawings can be executed in a computer system consisting of a group of computers executing instructions; although a logical order is given in the flowcharts, the steps shown or described can be executed in a different order in some cases.

Figure 1:
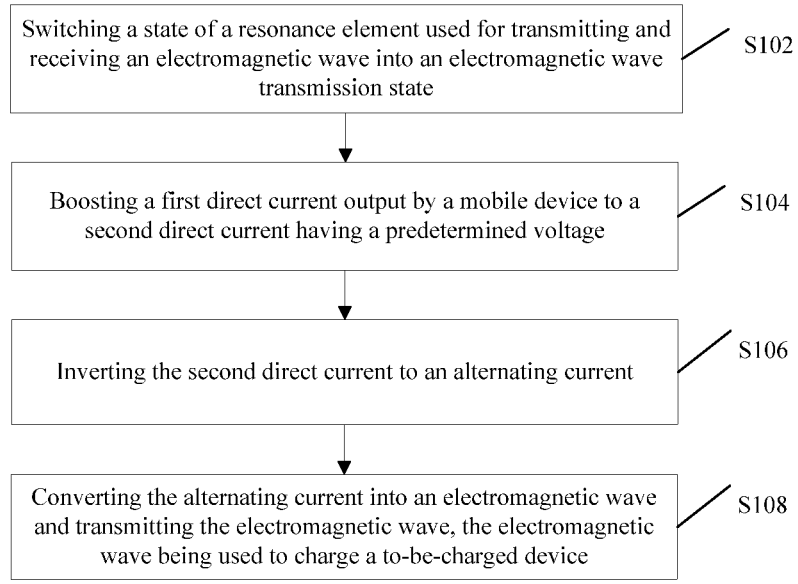
FIG. 1 is a schematic flowchart of a method for transmitting and receiving wireless power according to an embodiment of the disclosure.

One embodiment of the dislcosure provides a method for transmitting and receiving wireless power. FIG. 1 is a schematic flowchart of a method for transmitting and receiving wireless power according to an embodiment of the disclosure; as shown in FIG. 1, the method includes the following steps:

S102: switching a state of a resonance element used for transmitting and receiving an electromagnetic wave into an electromagnetic wave transmission state.

S104: boosting a first direct current output by a mobile device to a second direct current having a predetermined voltage.

S106: inverting the second direct current to an alternating current.

S108: converting the alternating current into an electromagnetic wave and transmitting the electromagnetic wave, wherein the electromagnetic wave is used for charging a to-be-charged device.

Through the above steps, by switching the state of the resonance element used for transmitting and receiving electromagnetic waves to the electromagnetic wave transmission state, subjecting the first direct current of the mobile device to boosting, inversion and current-electromagnetic wave conversion, and transmitting the electromagnetic wave which can be used for charging the to-be-charged device, the embodiments of the disclosure realizes the wireless charging for the to-be-charged device through the mobile device. Compared with the related art, the wireless charging for the to-be-charged device can be realized without a special wireless charging device; besides, the features of the mobile device such as big-capacity battery and portability are fully used; meanwhile based on the portability of the mobile device, an emergent charge mode is provided in some scenes, for example, in a condition of no charge cable, a device having a wireless charge function can be wirelessly charged through the wireless charge function of the mobile device in an emergency, eliminating troubles such as carrying a charger, a charger wire or a wireless charge transmitter. From the above content it can be learned that the embodiment provides a solution for wirelessly charging other peripheral devices through the terminal, and thereby solves the problem in the related art of a lack of such a solution.

In an example embodiment, the device for implementing the above method can be a device embedded into a mobile device, or can be a plug and play external device, for example, an external device connected via a Universal Serial Bus (USB) interface or a micro USB interface of the mobile device. Moreover, this device can be independent of the resonance element used for transmitting electromagnetic waves.

In an example embodiment, a component, for example the resonance element, used for transmitting the electromagnetic waves in the device can be a newly-added function component or can be an existing function component in the mobile device. For example, in the mobile device supporting the wireless charge function, there is a coil used for receiving the electromagnetic waves, which after subjected to some processing can be directly used for transmitting the electromagnetic waves. In this way, it is unnecessary to add a big-volume coil to the mobile device, avoiding increment in a volume, a thickness and a weight of the mobile device.

In a case that receiving electromagnetic waves and transmitting electromagnetic waves reuse one same coil, one or two switch elements can be used for controlling the coil to receive or transmit the electromagnetic waves; for example, connecting the inversion element with the resonance element via the switch element, thereby enabling the coil to transmit the electromagnetic waves; for another example, connecting the rectification element of a device for receiving wireless power with the resonance element via the switch element, thereby enabling the coil to receive the electromagnetic waves, so as to charge the mobile device.

In an example embodiment, switching the stated of the resonance element to the electromagnetic wave transmission state is realized through a switch component, for example, the ON and OFF of the switch element can be determined according to an input of a user, the user can connect the inversion element with the resonance element by inputting certain instructions or adopting a predetermined operation when needing to wirelessly charge other devices, so as to enabling the coil to transmit electromagnetic waves to charge other to-be-charged devices; or, the user can connect the resonance element with the rectification element of the wireless power receiving device by inputting certain instructions when needing to receive electromagnetic waves transmitted by other devices used for wireless charge, so as to enable the coil to receive the electromagnetic waves transmitted by other devices used for charge.

In an example embodiment, a control on a boosting process can be implemented by adjusting a PWM signal duty ratio according to control information, or a control on an inversion process is implemented by adjusting at least one parameter of the inversion device according to control information. For example, in a case that the inversion device adopts a circuit consisting of discrete components to realize inversion, the control on the inversion process can be implemented by adjusting an input of the circuit or at least one parameter or one or more discrete components according to the control information; in a case that the inversion device adopts an integrated chip to realize inversion, the ON and OFF of corresponding pins can be controlled according to the control information, so that the chip automatically completes a adjustment on the inversion process.

In an example embodiment, in order to accurately boost the voltage of the first direct current to a predetermined voltage, a method for closed loop control can be adopted; for example, the first direct current first is boosted by the boosting element, then a voltage of the output boosted direct current is detected at a output end of the boosting element, and it is judged whether the boosted voltage is equal to the required predetermined voltage; if not, a duty ratio of a PWM signal of the boosting element is adjusted, so as to realize a control on a boosting of the first direct current, thereby enabling the voltage of the second direct current obtained after boosting to be stable around the predetermined voltage.

In an example embodiment, in the above method, after voltage information of the boosted direct current is detected at the output end of the boosting element, it can be judged through the boosting element whether this voltage is equal to the predetermined voltage; the predetermined voltage is a preset fixed value or configured by the master control component; the detection result also can be sent to the master control component, which then judges whether this voltage is equal to the predetermined voltage, and sends control information about increasing or decreasing the PWM signal duty ratio to the boosting element, so as to adjust the voltage of the output direct current to the predetermined voltage.

In an example embodiment, inverting the second direct current to the alternating current can include: determining at least one parameter of a device used for inverting the second direct current to the alternating current according to the control information sent by the master control component, wherein the device can be a circuit consisting of discrete components, or can be an integrated chip used for realizing current inversion; inverting the second direct current to the alternating current according to the determined parameter.

In an example embodiment, before the electromagnetic waves is transmitted to other to-be-charged devices, an identification of the to-be-charged device can be recognized and some wireless charge information can be interacted, for example, a charging state of the to-be-charged device (for example, a charging voltage, a charging current) or a requirement of frequency and/or power on the electromagnetic waves by the to-be-charged device. After information interaction with the to-be-charged device, the information is sent to the master control component, so that the master control component can determine the at least one parameter for boosting or inversion according to the information obtained through interaction, thereby implementing adjustment on boosting and inversion processes and on the connection of corresponding switch elements.

Another embodiment also provides a device for transmitting and receiving wireless power, which is configured to implement the above-mentioned method for transmitting and receiving wireless power. The function of the device has been described in the above method embodiment, and no further description is needed here.

Figure 2:
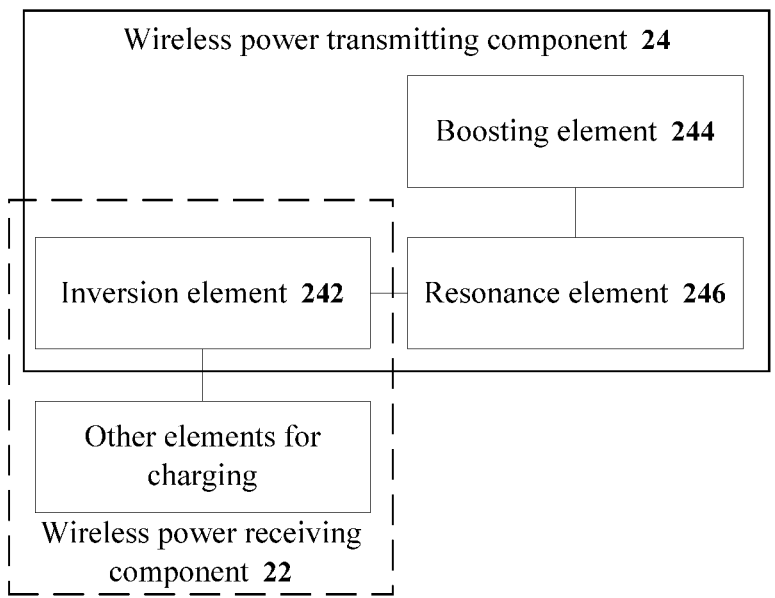
FIG. 2 is a structural schematic diagram of a device for transmitting and receiving wireless power according to an embodiment of the disclosure.

FIG. 2 is a structural schematic diagram of a device for transmitting and receiving wireless power according to an embodiment of the disclosure; as shown in FIG. 2, the device includes: a wireless power receiving component 22 and a wireless power transmitting component 24, wherein the wireless power receiving component 22 and the wireless power transmitting component 24 share one resonance element 242; the wireless power transmitting component 24 further includes: a boosting element 244 and an inversion element 246, wherein, the boosting element 244 is configured to boost a first direct current output by a mobile device to a second direct current having a predetermined voltage; the inversion element 246 is coupled with the boosting element 244 and configured to invert the second direct current to an alternating current; the resonance element 242 is coupled with the inversion element 246 and configured to convert the alternating current into an electromagnetic wave and transmit the electromagnetic wave, wherein the electromagnetic wave is used for charging a to-be-charged device.

All components and elements involved in the embodiment of the disclosure can be realized through software, or can be realized through hardware. The components and elements described in the embodiment also can be set in a processor, for example, it can be described as: a processor includes a wireless power receiving component 22 and a wireless power transmitting component 24. Here, names of the components in some cases does not give a limit to the components, for example, the boosting element 244 also can be described as a component configured to boost the first direct current output by the mobile device to the second direct current having the predetermined voltage.

In an example embodiment, the resonance element 242 is further configured to convert a received electromagnetic wave into an alternating current and transmit the converted alternating current to a rectification element of the wireless power receiving component 22.

Figure 3:
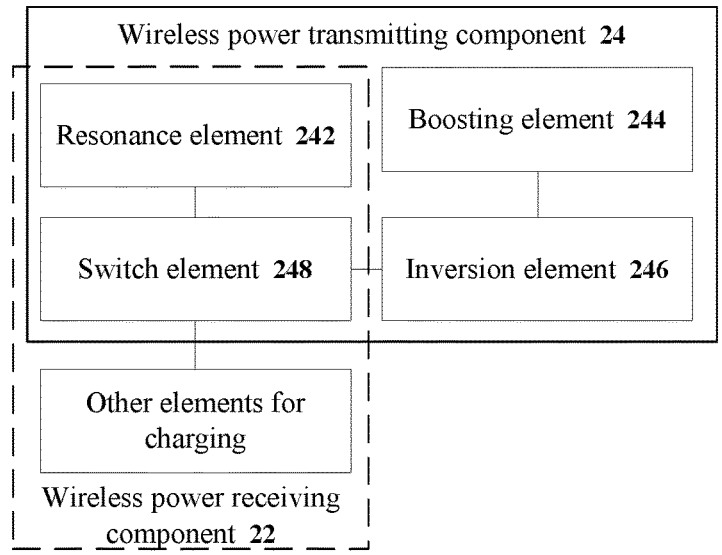
FIG. 3 is a structural schematic diagram of a device for transmitting and receiving wireless power according to a first example embodiment of the disclosure.

FIG. 3 is a structural schematic diagram of a device for transmitting and receiving wireless power according to a first embodiment of the disclosure; as shown in FIG. 3, the device further includes: a switch element 248, which is configured to switch on a connection between the inversion element 246 and the resonance element 242 or switch on a connection between the rectification element 222 and the resonance element 242.

Figure 4:
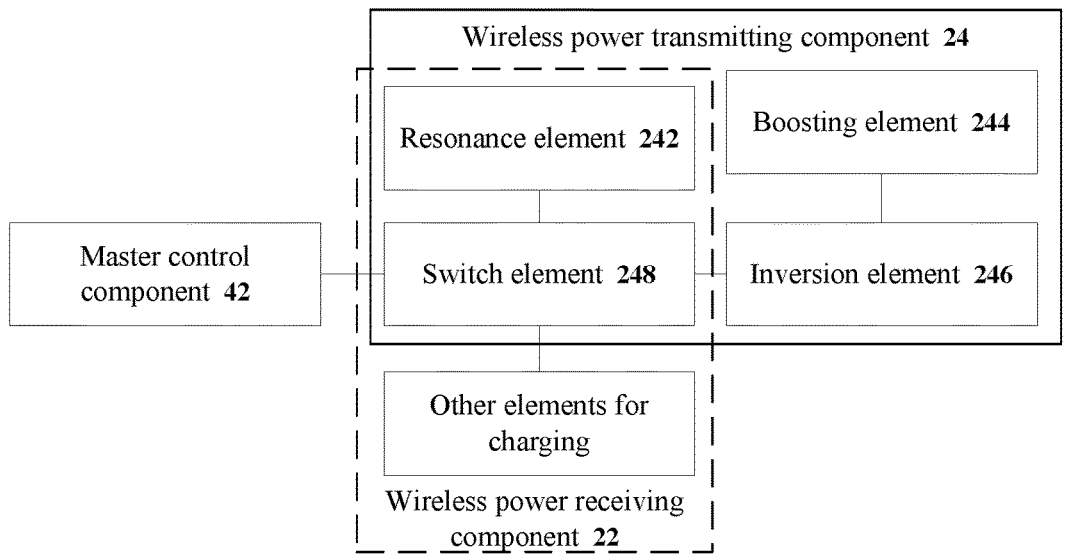
FIG. 4 is a structural schematic diagram of a device for transmitting and receiving wireless power according to a second example embodiment of the disclosure.

FIG. 4 is a structural schematic diagram of a device for transmitting and receiving wireless power according to a second embodiment of the disclosure; as shown in FIG. 4, the device further includes: a master control component 42, which is coupled with the switch element 248 and configured to send a switching signal to the switch element 248 according to an input of a user, wherein the switching signal is used for indicating the switch element 248 to connect the inversion element 246 with the resonance element 242, or, connect the rectification element 222 with the resonance element 242.

In an example embodiment, the master control component 42 is further configured to send control information, wherein the control information is used for adjusting at least one parameter of the boosting element 244 or the inversion element 246.

Figure 5:
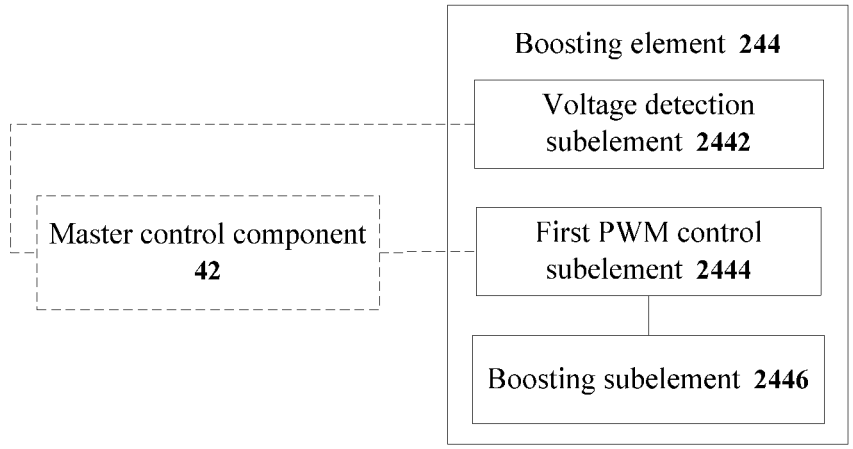
FIG. 5 is a structural schematic diagram of a boosting element 244 in a device for transmitting and receiving wireless power according to an example embodiment of the disclosure.

FIG. 5 is a structural schematic diagram of a boosting element 244 in a device for transmitting and receiving wireless power according to an example embodiment of the disclosure; as shown in FIG. 5, the boosting element 244 includes: a voltage detection subelement 2442, a first PWM control subelement 2444 and a boosting subelement 2446, wherein, the voltage detection subelement 2442 is coupled with a output end of the boosting subelement 2446 and the master control component 42 and configured to detect a voltage of a direct current output by the boosting subelement 2446 and feed back the detection result to the master control component 42; the first PWM control subelement 244 is coupled with the master control component 42 and configured to determine a PWM signal duty ratio according to the control information sent by the master control component 42, wherein the control information is determined by the master control component 42 according to the detection result; the boosting subelement 2446 is coupled with the first PWM control subelement 244 and configured to adjust a voltage of a output direct current to the predetermined voltage according to the PWM signal duty ratio.

Figure 6:
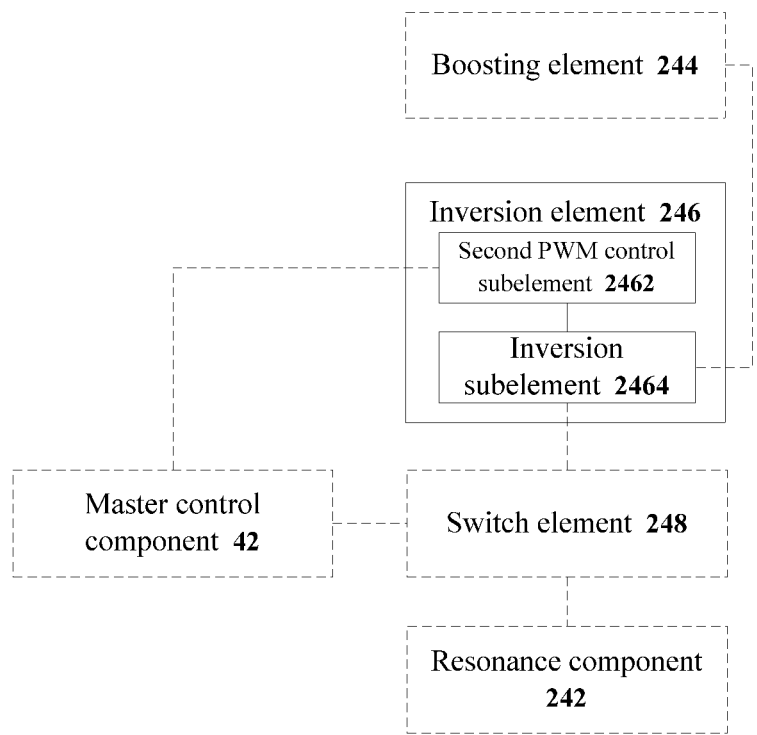
FIG. 6 is a structural schematic diagram of an inversion element 246 in a device for transmitting and receiving wireless power according to an example embodiment of the disclosure.

FIG. 6 is a structural schematic diagram of an inversion element 246 in a device for transmitting and receiving wireless power according to an example embodiment of the disclosure; as shown in FIG. 6, the inversion element 246 includes: a second PWM control subelement 2462 and an inversion subelement 2464, wherein, the second PWM control subelement 2462 is coupled with the master control component 42 and configured to determine at least one parameter of the inversion subelement 2464 according to the control information sent by the master control component 42; the inversion subelement 2464 is coupled with the second PWM control subelement 2462 and configured to invert the second direct current to the alternating current according to the parameter determined by the second PWM control subelement 2462.

Figure 7:
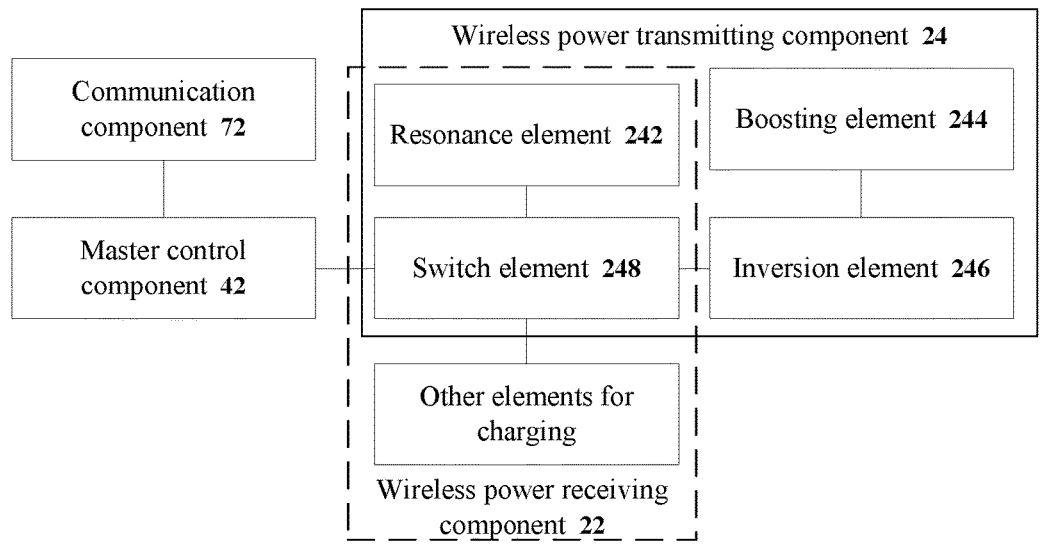
FIG. 7 is a structural schematic diagram of a device for transmitting and receiving wireless power according to a third example embodiment of the disclosure.

FIG. 7 is a structural schematic diagram of a device for transmitting and receiving wireless power according to a third example embodiment of the disclosure; as shown in FIG. 7, the device further includes: a communication component 72, which is coupled with the master control component 42 and configured to interact information with the to-be-charged device and send the information to the master control component 42, wherein the master control component 42 determines the at least one parameter of the inversion element 246 according to the information.

A description is provided below in conjunction with example embodiments.

This example embodiment provides a method for realizing a wireless charge transmission at a mobile phone side, relating to a application field of electronic equipment, and in particular to a field of mobile phones.

A method for realizing a wireless charge transmission at a mobile phone side is provided in this example embodiment; with this method, a terminal user can implement wireless power transmission between mobile phones. Specifically, this method boosts a output voltage at a mobile phone side, for example, a battery voltage and an USB output voltage, cooperates with certain modulation circuits and finally enables the mobile phone to supply power to other terminals as a transmitter.

A power source system of the mobile phone mainly acquires electrical energy from a battery; at present, most mobile phones adopt lithium ion batteries; for a mobile phone, a battery voltage for normal working is from 3.5V to 4.2V, even to 4.35V of the direct current voltage (taking the present high-voltage battery into consideration). In view of this condition, the method is to boost a voltage to a reasonable scope; and the boosting process does not limit to a adoption of a boosting integrated chip or discrete components. The boosted voltage is subjected to full-bridge or half-bridge modulation, then the direct current voltage is inverted to an alternating current voltage to supply energy for a resonance circuit of an inductor capacitor (LC) of the mobile phone, and finally the LC resonance circuit converts the electrical energy into magnetic energy to be transmitted wirelessly, so that the magnetic energy is received by a receiver, thereby meeting charging requirement and service requirement of the receiver.

Figure 8:
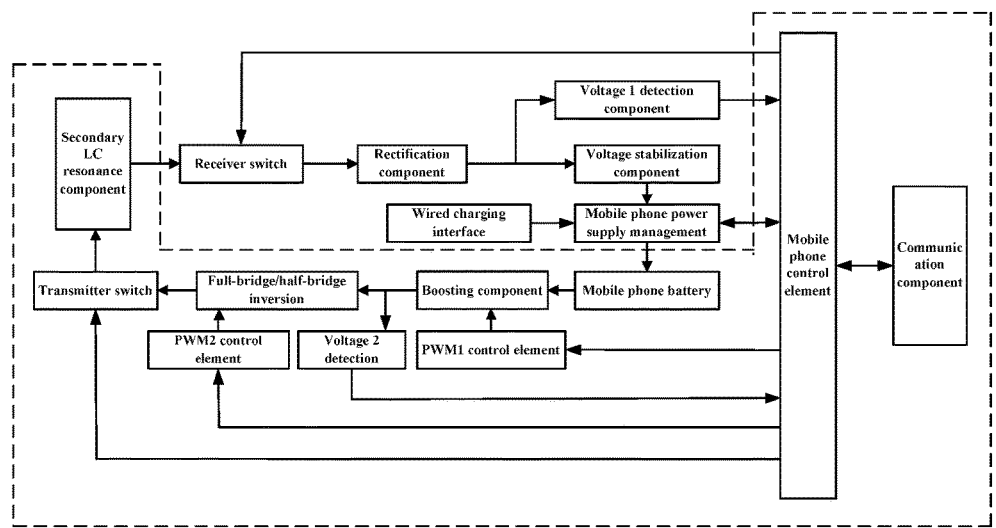
FIG. 8 is a structural schematic diagram of a wireless charge function according to an example embodiment of the disclosure.

FIG. 8 is a structural schematic diagram of a wireless charge function according to an example embodiment of the disclosure; a structural block diagram of the wireless charge component shown in FIG. 8 includes a receiving function and transmitting function of wireless charging of a mobile phone terminal, what shown in a dashed box is an example scheme of the example embodiment, wherein a charging transmitting performance is implemented through a wireless charging receiving coil of the terminal. A user can select a transmission or reception of wireless charging through a software interface of the mobile phone, and this behaviour is conducted by a hardware circuit controlling a transmitting/receiving switch to switch circuits.

The wireless charging transmitter of the terminal mainly includes the following components: a mobile phone control element 42 (equivalent to the above master control element 42), a boosting component 22, a full-bridge/half-bridge modulation component 24 (equivalent to the above inversion component 24), a transmitter switch component 32 (equivalent to the above switch component 32), an LC resonance component 26 (equivalent to the above resonance component 26) and a communication component 72.

Functions of the mobile phone control element 42 mainly includes at least one of the following: 1, driving a transmitter or receiver switch 32 so as to make the mobile phone work in a transmission or receiving state according to a configuration, which is configured through an application software at the mobile phone side; 2, if the boosting component 22 consists of discrete components, providing a PWM control signal for the boosting component 22, and meanwhile detecting the output voltage from the boosting component 22, and adjusting the PWM duty ratio according to the output voltage; if the boosting circuit 22 (equivalent to the boosting component 22) is an integrated circuit, providing output voltage setting information, and the boosting function is adjusted by the integrated circuit automatically; 3, providing a PWM control signal for the full-bridge/half-bridge inversion circuit 24 (equivalent to the full-bridge/half-bridge modulation component 24); 4, interacting with the communication component 72, performing calculation according to the information provided by the communication component 72, and adjusting the boosting component 22 and the full-bridge/half-bridge inversion circuit 24.

Functions of the boosting component 22 includes at least one of the following: the maximum battery voltage of the mobile phone terminal is 4.35V at present; if to charge other devices, a higher voltage needs to be provided; therefore, it is needed to perform a boosting operation. The boosting component 22 includes a boosting circuit 226 (equivalent to the boosting element 226), a PWM control signal 224 (equivalent to the first PWM control element 224) and a voltage detection element 222. The boosting circuit 226 completes the boosting function, the PWM control signal 224 impacts a size of the output voltage from the boosting circuit 226, and the voltage detection element 222 provides a basis for a adjustment on the PWM signal duty ratio; these three elements cooperate with each other to form a closed loop circuit to complete the boosting function.

The full-bridge/half-bridge modulation component 24 (that is, full-bridge/half-bridge modulation component 24): the power source is supplied by the boosting component 22; the direct current is converted into an alternating current to provide a signal for the LC resonance circuit, by adjusting a connection order and connection time of a switch tube in the component. The adjustment on the connection order and the connection time can be given by the mobile phone control element 42, and then is provided through the PWM2 control element 242 (equivalent to the second PWM control element 242). The PWM2 control element 242 can be realized by a half-bridge driving chip or a combination of discrete components.

The transmitter switch component 32 is configured to be selected as a transmitter or a receiver. When application software at the mobile phone side selects the transmitter function, the transmitter switch is closed and the receiver switch is opened; when the application software at the mobile phone side selects the receiver function, the transmitter switch is opened and the receiver switch is closed.

The LC resonance component 26: a signal after full-bridge/half-bridge modulated is converted into a magnetic energy from an electrical energy through the LC resonance circuit; therefore, the LC resonance component 26 mainly completes a conversion of the electrical energy into the magnetic energy. After the to-be-charged device receives the magnetic energy, the device will convert part magnetic energy into needed electrical energy used for charging.

The communication component 72 interacts with the to-be-charged device, confirms identification and a charging state (including a charging voltage and a charging current) of the to-be-charged device, and sends the information to the mobile phone control element 42 to process.

The implementation scheme of the boosting circuit of the transmitter at the mobile phone side is described below and this scheme introduces two example schemes. It needs to be noted that specific applications include but not limited to these two schemes.

Figure 9:
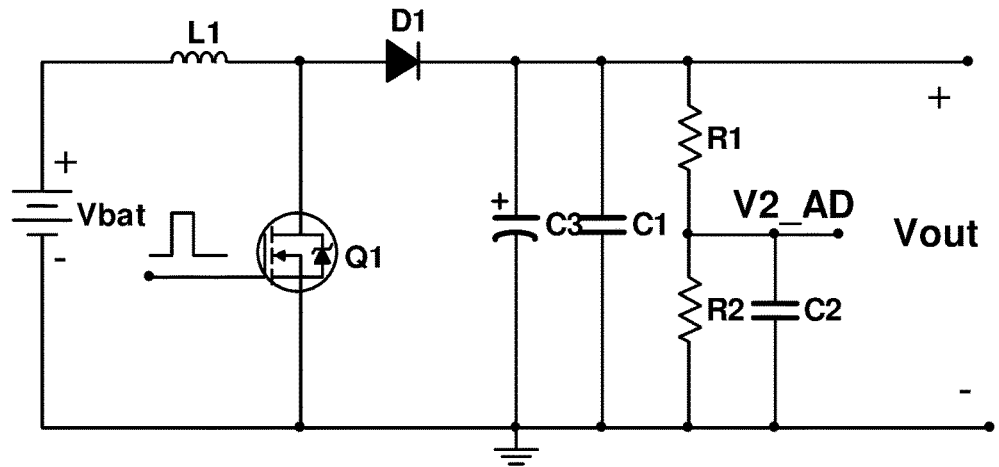
FIG. 9 is a hardware circuit schematic diagram of a boosting circuit according to a first example embodiment of the disclosure.

FIG. 9 is a hardware circuit schematic diagram of a boosting circuit according to preferred first example embodiment of the disclosure; the scheme (a) shown in FIG. 9 includes: discrete components compose a boosting circuit, specifically, an inductor L1, a diode D1, a switch tube Q1 compose a basic boosting circuit; a mobile phone control component adjusts a Q1 driving signal to stabilize a output voltage (Vout) according to a voltage V2_AD provided by a voltage detection circuit consisting of R1 and R2.

Figure 10:
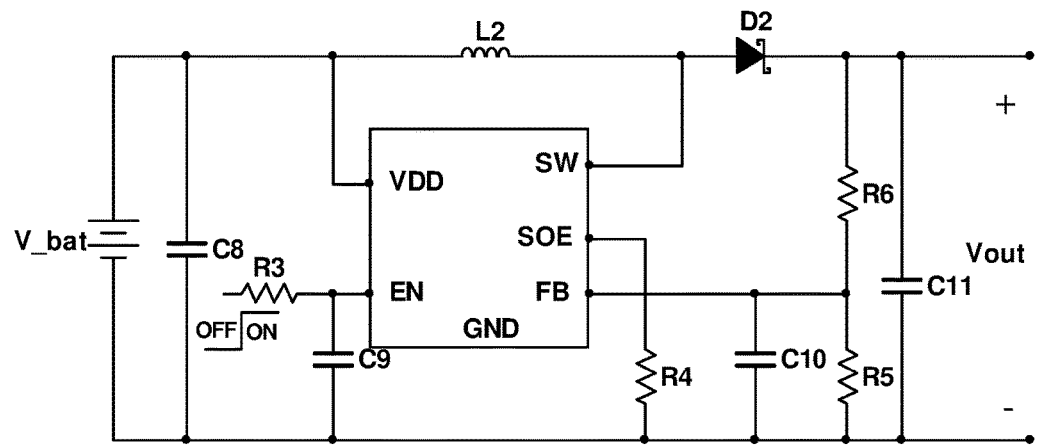
FIG. 10 is a hardware circuit schematic diagram of a boosting circuit according to a second embodiment of the disclosure.

FIG. 10 is a hardware circuit diagram of a boosting circuit according to a second example embodiment of the disclosure; the scheme (b) shown in FIG. 10 includes: a boosting voltage adopts an integrated chip; the voltage detection and other functions are completed by the chip itself; the mobile phone control component only needs to send a trigger signal at the chip enabling end, to complete the boosting function.

The implementation scheme of the modulation circuit of the transmitter at the mobile phone side is described below; this scheme introduces two example modes. It needs to be noted that specific applications include but not limited to these two schemes to complete the conversion of direct current signal into alternating current signal.

Figure 11:
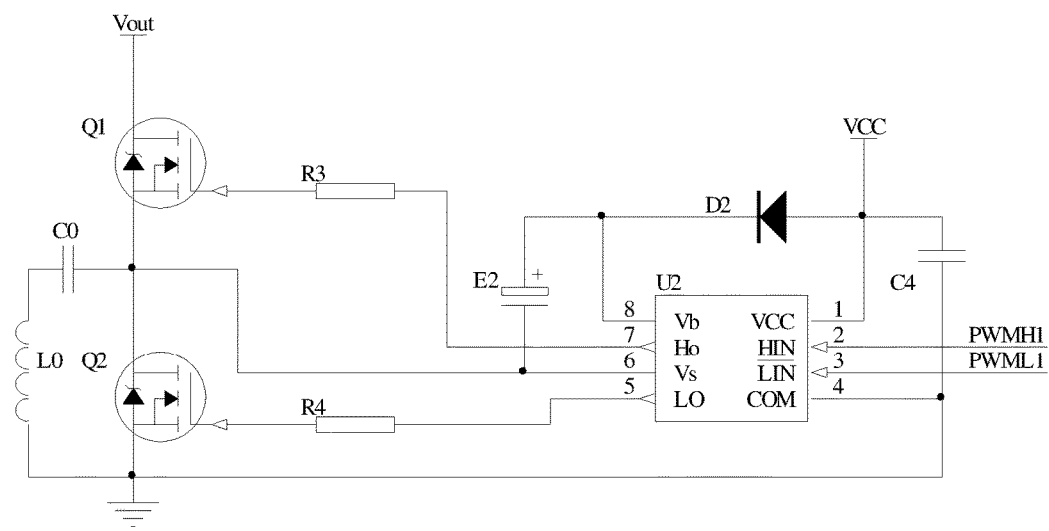
FIG. 11 is a hardware circuit schematic diagram of a modulation circuit according to a first example embodiment of the disclosure.
Figure 12:
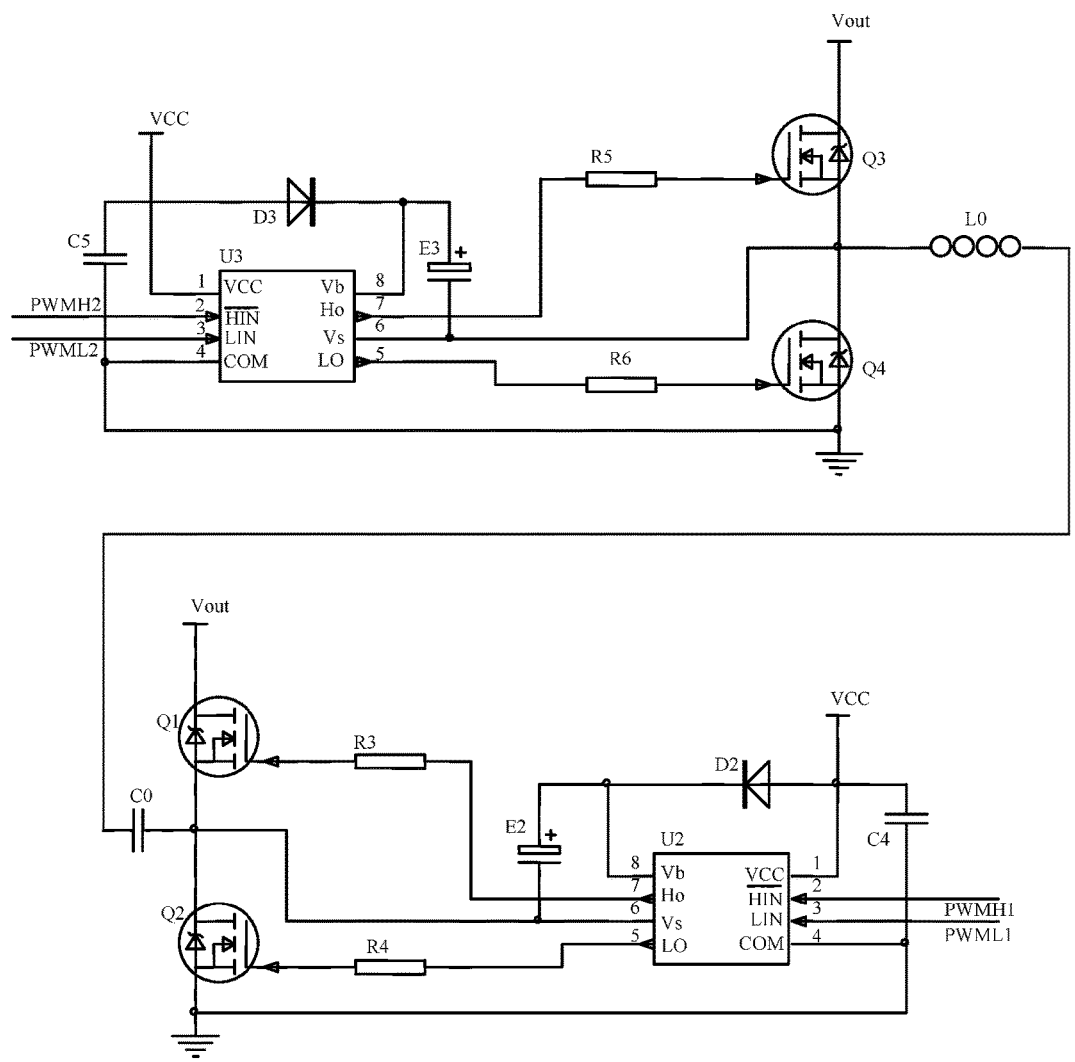
FIG. 12 is a hardware circuit schematic diagram of a modulation circuit according to a second example embodiment of the disclosure.

FIG. 11 and FIG. 12 are hardware circuit diagrams and of a modulation circuit according to a first example and a second example embodiment of the disclosure; FIG. 11 shows a half-bridge modulation mode and FIG. 12 shows a full-bridge modulation mode.

In the half-modulation shown in FIG. 11, PWM signals output by the mobile phone control component 42, that is, PWMH and PWML, are provided to a half-bridge circuit consisting of a switch tube Q1 and a switch tube Q2 via a half-bridge driving chip U2; the U2 can ensure a driving capability and dead zone characteristics of the two switch signals. A peripheral diode D2 and an electrolytic capacitor E2 of the driving chip U2 compose a bootstrap circuit, which provides power for the Q1 driving circuit. The mobile phone control component 42 adjusts a connection order and a connection time of the switch tube in the full-bridge/half-bridge modulation circuit according to the information provided by the communication component.

It needs to be noted that actual applications of the modulation circuit include but not limited to the two modes shown in FIG. 11 and FIG. 12, also can include any modulation circuits known in the related art in this field and variations of these circuits.

The above example embodiments provide at the mobile phone side a new function for transmitting wireless power to other terminals, which, according to inherited features of a mobile phone power supply system, takes the mobile phone as a wireless charging transmitter to complete the wireless power transmission or the wireless charging function between mobile phones or between the mobile phone and other wirelessly charged products, thereby making the power transmission scene more convenient. For example, a user can supply power to other terminals or support the power consumption operation of other terminals by means of this function in the condition of no standard charger or charging platform.

In the embodiment of the disclosure, the transmitter coil can directly use an original receiving coil at the mobile phone terminal; therefore, while providing a power transmission function for other terminals, the disclosure does not add too many extra parts, nor affect a thickness of the mobile phone terminal.

INDUSTRIAL APPLICABILITY

The device for transmitting and receiving wireless power provided by the embodiments of the disclosure can realize the wireless charging for a to-be-charged device through a mobile device by switching a state of a resonance element used for transmitting and receiving electromagnetic waves to an electromagnetic wave transmission state, subjecting a first direct current of the mobile device to voltage boosting, inversion and current-electromagnetic wave conversion in turn and transmitting an electromagnetic wave capable of charging the to-be-charged device, by making full use of an existing antenna.

Obviously, those skilled in the art should understand that the components or steps described above can be implemented by a common computer device; the components or steps can be integrated on a single computing device or distributed on a network composed of a plurality of computing devices; optionally, the components or steps can be implemented by a programming code executable by a computing device, thus they can be stored in a storage device to be executed by a computing device, or manufactured into individual integrated circuit component respectively, or several of them can be manufactured into a single integrated circuit component to implement; in this way, the disclosure is not limited to any combination of specific hardware and software.

The above are only the example embodiments of the disclosure and not intended to limit the disclosure. For those skilled in the art, various modifications and changes can be made to the disclosure. Any modification, equivalent substitute and improvement made within the spirit and principle of the disclosure are intended to be included within the scope of protection of the disclosure.

What is claimed is:

1. A device for transmitting and receiving wireless power, comprising: a wireless power receiving component, a wireless power transmitting component and a master control component, wherein the wireless power receiving component and the wireless power transmitting component share one resonance element;
the wireless power transmitting component further comprises: a boosting element and an inversion element;
the boosting element is configured to boost a first direct current output by a mobile device to a second direct current having a predetermined voltage;
the inversion element is connected with the boosting element and configured to invert the second direct current to an alternating current;
the resonance element is connected with the inversion element and configured to convert the alternating current into an electromagnetic wave and transmit the electromagnetic wave, wherein the electromagnetic wave is used for charging a to-be-charged device;
wherein the master control component is configured to send control information, wherein the control information is used for adjusting at least one parameter of the boosting element or the inversion element;
wherein the boosting element comprises: a voltage detection subelement, a first Pulse Width Modulation (PWM) control subelement and a boosting subelement, wherein
the voltage detection subelement is configured to detect a voltage of a direct current output by the boosting subelement and to feed back a detection result to the master control component;
the first PWM control subelement is configured to determine a PWM signal duty ratio according to the control information sent by the master control component, wherein the control information is determined by the master control component according to the detection result;
the boosting subelement is configured to adjust the voltage of the output direct current to the predetermined voltage according to the PWM signal duty ratio.

2. The device as claimed in claim 1, wherein the resonance element is further configured to convert a received electromagnetic wave into an alternating current and transmit the converted alternating current to a rectification element of the wireless power receiving component.

3. The device as claimed in claim 2, further comprising: a switch element, which is configured to switch on a connection between the inversion element and the resonance element or switch on a connection between the rectification element and the resonance element.

4. The device as claimed in claim 3, wherein
the master control component is further configured to send a switching signal to the switch element according to an input of a user, wherein the switching signal is used for indicating the switch element to switch on a connection between the inversion element and the resonance element, or, between the rectification element and the resonance element.

5. The device as claimed in claim 1, wherein the inversion element comprises: a second PWM control subelement and an inversion subelement, wherein
the second PWM control subelement is configured to determine at least one parameter of the inversion subelement according to the control information sent by the master control component;
the inversion subelement is configured to invert the second direct current to the alternating current according to at least one parameter determined by the second PWM control subelement.

6. The device as claimed in claim 1, further comprising: a communication component, which is configured to interact information with the to-be-charged device and send the information to the master control component, wherein the master control component determines the at least one parameter of the inversion element according to the information.

7. The device as claimed in claim 5, further comprising: a communication component, which is configured to interact information with the to-be-charged device and send the information to the master control component, wherein the master control component determines the at least one parameter of the inversion element according to the information.

8. A method for transmitting and receiving wireless power, comprising:
switching a state of a resonance element used for transmitting and receiving an electromagnetic wave into an electromagnetic wave transmission state;

boosting a first direct current output by a mobile device to a second direct current having a predetermined voltage;

inverting the second direct current to an alternating current;

converting the alternating current into an electromagnetic wave and transmitting the electromagnetic wave, wherein the electromagnetic wave is used for charging a to-be-charged device;

wherein boosting the first direct current output by the mobile device to the second direct current having the predetermined voltage comprises: detecting a voltage of the output boosted direct current and sending the detection result to a master control component; determining a PWM signal duty ratio according to control information sent by the master control component, wherein the control information is determined by the master control component according to the detection result; adjusting the voltage of the output direct current to the predetermined voltage according to the PWM signal duty ratio.

9. The method as claimed in claim 8, wherein inverting the second direct current to the alternating current comprises:

determining at least one parameter used for inverting the second direct current according to the control information sent by the master control component;

inverting the second direct current to the alternating current according to the at least one parameter used for inverting the second direct current.

* * * * *